United States Patent
Yang et al.

(10) Patent No.: US 10,554,803 B2
(45) Date of Patent: Feb. 4, 2020

(54) METHOD AND APPARATUS FOR GENERATING UNLOCKING INTERFACE, AND ELECTRONIC DEVICE

(71) Applicant: BEIJING KINGSOFT INTERNET SECURITY SOFTWARE CO., LTD., Beijing (CN)

(72) Inventors: Shiduo Yang, Beijing (CN); Haoliang Xiao, Beijing (CN); Ziyi Nian, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/578,285

(22) PCT Filed: Sep. 14, 2015

(86) PCT No.: PCT/CN2015/089504
§ 371 (c)(1),
(2) Date: Nov. 30, 2017

(87) PCT Pub. No.: WO2016/197469
PCT Pub. Date: Dec. 15, 2016

(65) Prior Publication Data
US 2018/0159971 A1     Jun. 7, 2018

(30) Foreign Application Priority Data
Jun. 11, 2015   (CN) .......................... 2015 1 0319540

(51) Int. Cl.
*G06F 3/048* (2013.01)
*H04M 1/725* (2006.01)
(Continued)

(52) U.S. Cl.
CPC ...... *H04M 1/72522* (2013.01); *G06F 3/0485* (2013.01); *G06F 3/04842* (2013.01);
(Continued)

(58) Field of Classification Search
CPC .. H04M 1/72522; G06F 9/451; G06F 3/0485; G06F 21/36; G06F 3/04842; G06F 3/048; G06T 5/002
See application file for complete search history.

(56) References Cited

U.S. PATENT DOCUMENTS

| | | | |
|---|---|---|---|
| 8,223,165 B1 * | 7/2012 | Jitkoff | G06T 3/0012 345/581 |
| 2002/0000998 A1 * | 1/2002 | Scott | G06F 17/30274 345/667 |

(Continued)

FOREIGN PATENT DOCUMENTS

| CN | 102855065 | 1/2013 |
|---|---|---|
| CN | 103425452 | 12/2013 |

(Continued)

OTHER PUBLICATIONS

ISA/CN, Written Opinion of the International Searching Authority for PCT/CN2015/089504, dated Feb. 9, 2016.
(Continued)

*Primary Examiner* — Jeanette J Parker
(74) *Attorney, Agent, or Firm* — Hodgson Russ LLP (57) ABSTRACT

The present disclosure provides a method, apparatus, and device for generating an unlocking interface, including: receiving an unlocking request; determining an application to be unlocked and a first icon file of the application according to the unlocking request; extracting a first color value according to the first icon file of the application and forming a first display layer of an unlocking interface corresponding to the application according to the first color
(Continued)

value; acquiring a pre-generated special-effects picture corresponding to the first icon file of the application and forming a second display layer of the unlocking interface corresponding to the application according to the special-effects picture; forming a third display layer of the unlocking interface corresponding to the application according to unlocking interactive information of the application locker; superimposing the first display layer, the second display layer and the third display layer with respective specified transparencies to generate the unlocking interface.

18 Claims, 8 Drawing Sheets

(51) Int. Cl.
| | | |
|---|---|---|
| *G06F 9/451* | (2018.01) | |
| *G06F 3/0484* | (2013.01) | |
| *G06F 3/0485* | (2013.01) | |
| *G06F 21/36* | (2013.01) | |
| *G06T 5/00* | (2006.01) | |

(52) U.S. Cl.
CPC .............. *G06F 9/451* (2018.02); *G06F 21/36* (2013.01); *G06T 5/002* (2013.01)

(56) References Cited

U.S. PATENT DOCUMENTS

| | | | | |
|---|---|---|---|---|
| 2008/0198175 A1* | 8/2008 | Sun | ........................ | H04N 1/3876 345/629 |
| 2009/0274363 A1* | 11/2009 | Dai | .................... | G06K 9/00456 382/164 |
| 2010/0316290 A1* | 12/2010 | Jia | ........................ | G06F 17/3025 382/165 |
| 2012/0063740 A1* | 3/2012 | Lee | ........................ | H04N 13/02 386/230 |
| 2012/0240071 A1* | 9/2012 | Park | ........................ | G06F 3/0488 715/769 |
| 2012/0313956 A1* | 12/2012 | Zhou | ........................ | G06T 11/00 345/582 |
| 2013/0235071 A1* | 9/2013 | Ubillos | .................... | G06F 3/0484 345/600 |
| 2013/0329006 A1* | 12/2013 | Boles | .................... | H04N 1/40056 348/42 |
| 2014/0173700 A1* | 6/2014 | Awan | ..................... | H04L 63/107 726/4 |
| 2014/0325435 A1 | 10/2014 | Jung et al. | | |
| 2015/0091903 A1* | 4/2015 | Costello | .................... | G06T 15/20 345/426 |
| 2016/0063723 A1* | 3/2016 | Choi | ........................ | G06T 11/60 382/282 |
| 2016/0196665 A1* | 7/2016 | Abreu | ..................... | G06T 11/00 345/427 |
| 2017/0300700 A1* | 10/2017 | Li | ........................ | G06F 21/629 |

FOREIGN PATENT DOCUMENTS

| | | |
|---|---|---|
| CN | 103870155 | 6/2014 |
| CN | 104007927 | 8/2014 |
| CN | 104267891 A | 1/2015 |
| CN | 104267982 A | 1/2015 |
| CN | 104679379 A | 6/2015 |
| CN | 104866323 A | 8/2015 |

OTHER PUBLICATIONS

SIPO, Office Action for CN Application No. 201510319540, dated Aug. 10, 2017.

* cited by examiner

| performing a color analysis on the first icon file of the application to be unlocked to determine main colors of the first icon file of the application to be unlocked | ← S103a |

↓

| selecting a color that matches a preset condition from the main colors and determining a color value of the selected color as the first color value | ← S103b |

METHOD AND APPARATUS FOR GENERATING UNLOCKING INTERFACE, AND ELECTRONIC DEVICE

CROSS REFERENCE TO RELATED APPLICATION

This application is a U.S. national phase application of International Application No. PCT/CN2015/089504, filed on Sep. 14, 2015, which claims priority to Chinese Patent Application Serial No. 201510319540.0, filed with the Status Intellectual Property Office of P. R. China on Jun. 11, 2015 and titled as "method and apparatus for generating unlocking interface and electronic device", the entire contents of which are incorporated herein by reference.

FIELD

The present disclosure relates to a field of user interface design, and more particularly to a method and an apparatus for generating an unlocking interface and an electronic device.

BACKGROUND

In order to protect privacy, a user may usually install a software in a terminal device which can lock applications in the terminal device, and further locks applications according to his needs via the software. For example, one application in a phone may be locked via an application locking software. When the user uses this application, the phone may jump to an unlocking information input interface to prompt the user to input unlocking information from a current display interface and an act of opening this application is executed when the application locking software receives the unlocking information inputted by the user and determines that the unlocking information inputted is correct.

In the application locking software of the related art, the unlocking information input interface is displayed by selecting a specified picture or a picture of the software as a background of the unlocking information input interface in advance; further, when it is detected that the user inputs the unlocking information, special effects may be applied on the background real-time, so as to achieve a better viewing effect, such as a blur effect.

However, applying the special effects on the background real-time is to render a current background picture real-time, which requires substantial consumption on resources of a central processing unit or a graphics processing unit, thereby affecting operations of other applications.

SUMMARY

Embodiments of the present disclosure provide a method and an apparatus for generating an unlocking interface and an electronic device. The specific technical solutions are as follows.

The present disclosure provides a method for generating an unlocking interface, including: receiving an unlocking request for an application locked by an application locker; determining an application to be unlocked and a first icon file of the application to be unlocked according to the unlocking request; extracting a first color value according to the first icon file of the application to be unlocked and forming a first display layer of an unlocking interface corresponding to the application to be unlocked according to the first color value; acquiring a pre-generated special-effects picture corresponding to the first icon file of the application to be unlocked and forming a second display layer of the unlocking interface corresponding to the application to be unlocked according to the special-effects picture; forming a third display layer of the unlocking interface corresponding to the application to be unlocked according to unlocking interactive information of the application locker; superimposing the first display layer, the second display layer and the third display layer with respective specified transparencies to generate the unlocking interface.

The present disclosure provides an apparatus for generating an unlocking interface, including: a request receiving module, configured to receive an unlocking request for an application locked by an application locker; an application determining module, configured to determine an application to be unlocked and a first icon file of the application to be unlocked according to the unlocking request received by the request receiving module; a first display layer generating module, configured to extract a first color value according to the first icon file of the application to be unlocked and to form a first display layer of an unlocking interface corresponding to the application to be unlocked according to the first color value; a second display layer generating module, configured to acquire a pre-generated special-effects picture corresponding to the first icon file of the application to be unlocked and to form a second display layer of the unlocking interface corresponding to the application to be unlocked according to the special-effects picture; a third display layer generating module, configured to form a third display layer of the unlocking interface corresponding to the application to be unlocked according to unlocking interactive information of the application locker; an unlocking interface generating module, configured to superimpose the first display layer generated by the first display layer generating module, the second display layer generated by the second display layer generating module and the third display layer generated by the third display layer generating module with respective specified transparencies to generate the unlocking interface.

The present disclosure provides an electronic device, including: a housing, a processor, a memory, a displayer, a circuit board and a power circuit. The circuit board is arranged inside a space enclosed by the housing. The processor and the memory are disposed on the circuit board. The power circuit is configured to provide power for individual circuit or component of the electronic device. The memory is configured to store an executable program code. The processor is configured to run a program corresponding to the executable program code, by reading the executable program code stored in the memory, so as to perform the followings: receiving an unlocking request for an application locked by an application locker; determining an application to be unlocked and a first icon file of the application to be unlocked according to the unlocking request; extracting a first color value according to the first icon file of the application to be unlocked and forming a first display layer of an unlocking interface corresponding to the application to be unlocked according to the first color value; acquiring a pre-generated special-effects picture corresponding to the first icon file of the application to be unlocked and forming a second display layer of the unlocking interface corresponding to the application to be unlocked according to the special-effects picture; forming a third display layer of the unlocking interface corresponding to the application to be unlocked according to unlocking interactive information of the application locker; superimposing the first display layer, the second display layer and the third display layer with respective specified transparencies to generate the unlocking interface.

Embodiments of the present disclosure also provide a storage medium. The storage medium is configured to store an application, and the application is configured to perform the method for generating an unlocking interface according to embodiments of the present disclosure when the application is executed.

Embodiments of the present disclosure also provide an application. The application is configured to perform the method for generating an unlocking interface according to embodiments of the present disclosure when the application is executed.

BRIEF DESCRIPTION OF THE DRAWINGS

In order to explicitly illustrate technical solutions in embodiments of the present disclosure or in the related art, a brief introduction for the accompanying drawings used when describing the embodiments or the related art will be listed as follows. Apparently, the drawings described below are only corresponding to some embodiments of the present disclosure, and those skilled in the art may obtain other drawings according to these drawings without creative labor.

DETAILED DESCRIPTION

In order to explicitly illustrate technical solutions in embodiments of the present disclosure or in the related art, the technical solutions in the embodiments of the present disclosure will be described clearly and completely in connection with the drawings in the embodiments of the present disclosure as follows. Apparently, the described embodiments are only part of embodiments of the present disclosure, instead of the entire embodiments. Based on embodiments described herein, those skilled in the art may obtain all other embodiments without creative labor, which belongs to the protection scope of the present disclosure.

In order to protect privacy, a user may usually install a software in a terminal device which can lock applications in the terminal device, and further locks applications according to his needs via the software. For example, one application in a phone may be locked via an application locking software. When the user uses this application, the phone may jump to an unlocking information input interface to prompt the user to input unlocking information from a current display interface and an act of opening this application is executed when the application locking software receives the unlocking information inputted by the user and determines that the unlocking information inputted is correct.

In the application locking software of the related art, the unlocking information input interface is displayed by selecting a specified picture or a picture of the software as a background of the unlocking information input interface in advance; further, when it is detected that the user inputs the unlocking information, special effects may be applied on the background real-time, so as to achieve a better viewing effect, such as a blur effect.

However, applying the special effects on the background real-time is to render a current background picture real-time, which requires substantial consumption on resources of a central processing unit or a graphics processing unit, thereby affecting operations of other applications. In order to solve the above-mentioned problems, the present disclosure provides a method and an apparatus for generating an unlocking interface and an electronic device.

The method for generating an unlocking interface provided in the present disclosure will be described first.

It should be noted that the method provided in the present disclosure is applicable to a terminal device. In practical applications, the terminal device may include a touchable device such as a smartphone or a tablet computer.

Figure 1:
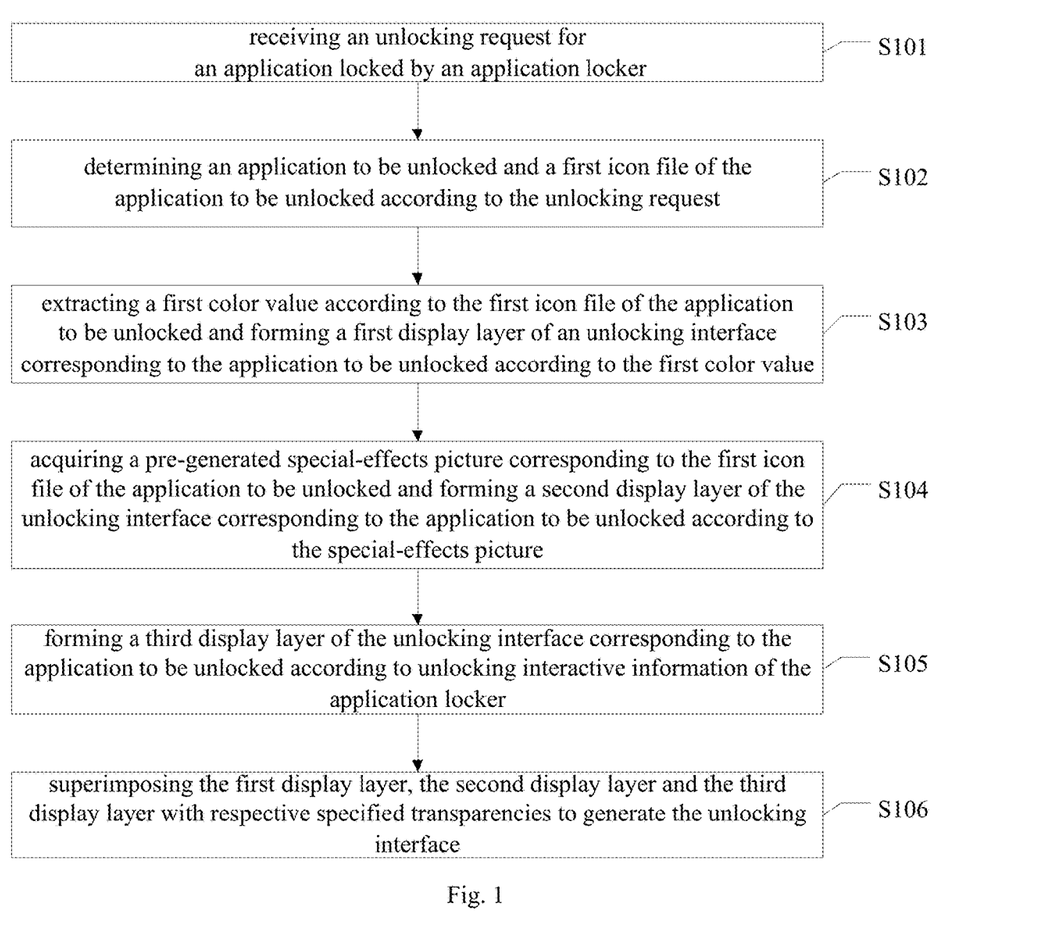
FIG. 1 is a flow chart of a method for generating an unlocking interface according to an embodiment of the present disclosure.

As illustrated in FIG. 1, the method for generating an unlocking interface provided in embodiments of the present disclosure includes followings.

Figure 2:
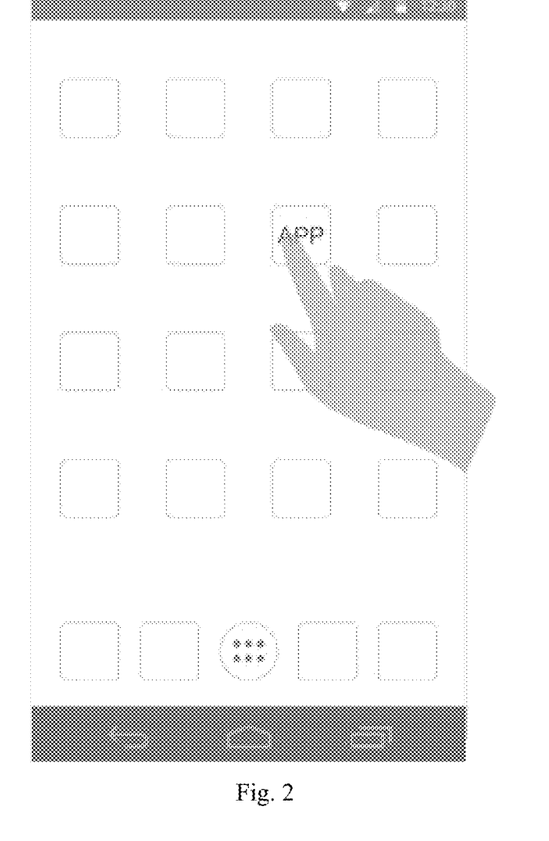
FIG. 2 is a schematic diagram illustrating a mode for selecting an application according to an embodiment of the present disclosure.

At S101, an unlocking request for an application locked by an application locker is received. For example, as illustrated in FIG. 2, when the user clicks an icon of an application (APP for short) in the unlocking interface of the application locker, the terminal device may receive that the application corresponding to the icon clicked by the user is an application that needs to be unlocked.

At S102, an application to be unlocked and a first icon file of the application to be unlocked are determined according to the unlocking request.

It should be appreciated that the unlocking request in the present disclosure carries an identifier of the application to be unlocked. After the unlocking request of the user is received, the application to be unlocked and the first icon file of the application to be unlocked may be determined according to the identifier of the application which is carried in the unlocking request. At S103, a first color value is extracted according to the first icon file of the application to be unlocked and a first display layer of an unlocking interface corresponding to the application to be unlocked is formed according to the first color value.

Figure 3:
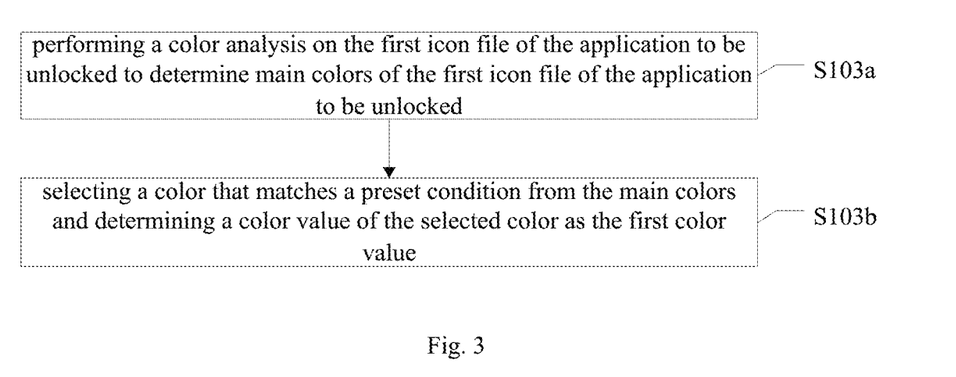
FIG. 3 is a flow chart of an embodiment of S103 according to an embodiment of the present disclosure.

According to a specific embodiment provided in the present disclosure, as illustrated in FIG. 3, extracting the first color value according to the first icon file of the application to be unlocked may include followings.

At S103a, a color analysis is performed on the first icon file of the application to be unlocked to determine main colors of the first icon file of the application to be unlocked.

Alternatively, the above-described S103a may include followings. The first icon file of the application to be unlocked is zoomed out to a preset first size to acquire a zoomed-out icon file. A Chroma scanning is performed on the zoomed-out icon file from outside to inside to acquire the mains colors of the first icon file of the application to be unlocked.

In detail, the first icon file of the application to be unlocked is zoomed out to a size with which the dominant colors may be identified easily. To avoid poor performance, the scanning starts from outside and then to inside, and the dominant colors (i.e. the main colors) may be analyzed from colors with higher proportions.

At S103b, a color that matches a preset condition is selected from the main colors and a color value of the selected color is determined as the first color value.

Since the dominant colors are varied with the icon of each application, the same background does not necessarily match all the icons. To make the overall vision more integrated, the color scheme of the application may be analyzed and applied in the background.

Alternatively, the above-described S103b may include followings. The main colors is transformed from a RGB (Red, green, blue) chromaticity space to a HUE chromaticity space to acquire a plurality of color codes. A color code with the highest proportion is determined from the plurality of color codes as the first color value.

In detail, when the main colors (or the dominant colors) are found out, the corresponding color numbers are transformed from RGB to HUE. The color code with the highest proportion may be found out from the corresponding color codes as the first color value. This design is to avoid the poor overall visual effect which may be caused by selecting the color automatically. In addition, a color block blacklist may be set, such as a white block, a black block, or other color block may be not used as the first color value.

According to a specific embodiment provided in the present disclosure, forming the first display layer of the unlocking interface corresponding to the application to be unlocked according to the first color value may include:

forming the first display layer of the unlocking interface, which corresponds to the application to be unlocked and has the first color value as a color value.

At S104, a pre-generated special-effects picture corresponding to the first icon file of the application to be unlocked is acquired and a second display layer of the unlocking interface corresponding to the application to be unlocked is formed according to the special-effects picture.

Alternatively, the special-effects picture corresponding to the first icon file of the application to be unlocked is one with blurred transparent effects.

Since the icon of the application is varied with the application developer in size, and in order to unify the display effect of each application that needs to be unlocked, generating the special-effects picture with the blurred transparent effects may include followings.

Act one: a size zooming is performed on the first icon file of the application to be unlocked to acquire a second icon file with a preset image size. In detail, a standard picture is acquired by using a Bitmap function, and the first icon file of the application to be unlocked is zoomed in/out into the standard picture to acquire the second icon file with the preset image size. A size of the standard picture is equal to a preset second size.

For example, a picture of 48×48 may be prepared in advance by the Bitmap function of the Android system, and the first icon file of the application to be unlocked is zoomed in/out into this picture of 48×48.

In at least one embodiment of the present disclosure, the preset second size in the embodiment of the present disclosure includes a length value and a width value of the picture, and the length value is equal to the width value.

Act two: transparent edges with preset length values are added to the second icon file to acquire a picture with the transparent edges.

Figure 4:
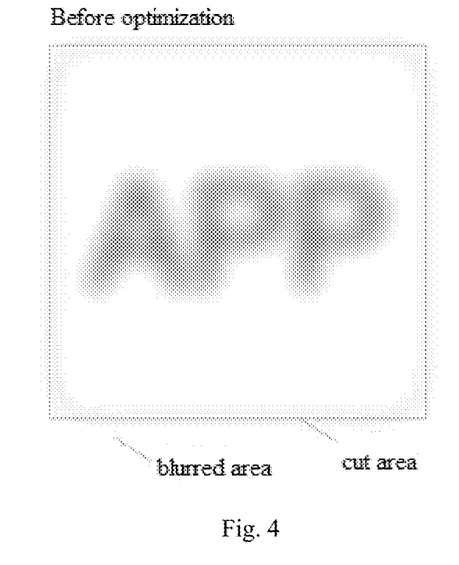
FIG. 4 is a picture which is not subjected to a processing of expanding edges according to an embodiment of the present disclosure.
Figure 5:
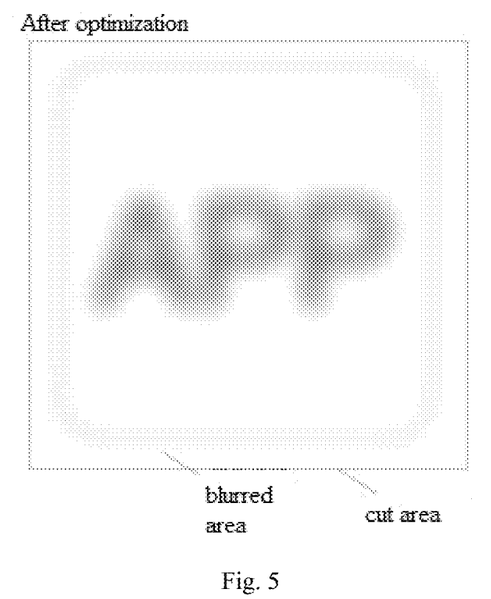
FIG. 5 is a picture which is subjected to a processing of expanding edges according to an embodiment of the present disclosure.

When the Gaussian blur technology is used to process the picture, the edges of the picture may be cut as illustrated in FIG. (c). In order to solve this problem, transparent edges may be added to the small icon. For example, a picture that requires the Gaussian blur is enlarged with 30 px (pixel) transparent edges, so that the edges of the picture that is processed by the blur algorithm are not cut, as illustrated in FIG. 5.

Act three: a Gaussian blur and an alpha blending are performed on the picture with the transparent edges to generate the special-effects picture with the blurred transparent effects.

An alpha blending processing is a technique configured to create the appearance of partial or full transparency for objects, such as the appearance of looking the object through the water, glass and other physical material through which there is a fuzzy transparent scene. The present disclosure employs this technique to process the special-effects picture, such that a better virtual transparency effect for the picture can be obtained.

At S105, a third display layer of the unlocking interface corresponding to the application to be unlocked is formed according to unlocking interactive information of the application locker.

Alternatively, the unlocking interactive information of the application locker includes an unlocking mode, an icon and a name of each of applications locked by the application locker. The above-described S105 may include: forming the third display layer of the unlocking interface which corresponds to the application to be unlocked and includes the icon and the name of the application to be unlocked according to the unlocking interactive information of the application locker.

For example, a numeric password input interface or a gesture input interface, and the icon and name of the application to be unlocked are displayed in the third display layer of the unlocking interface.

Figure 7:
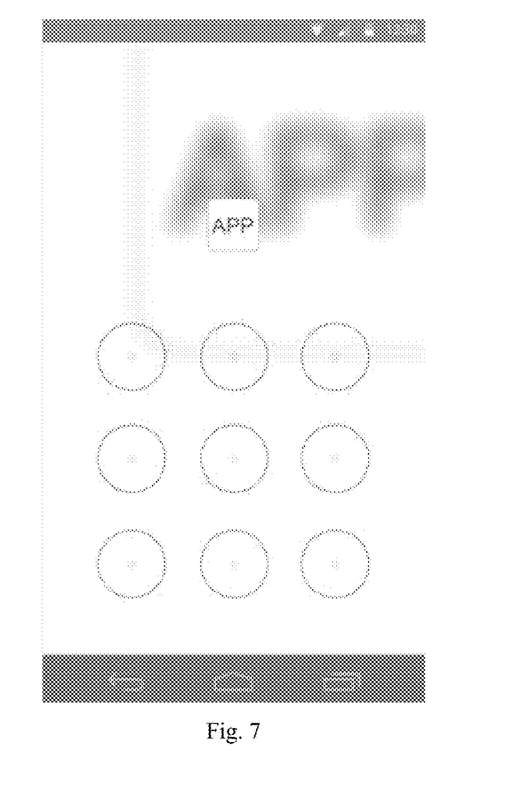
FIG. 7 is a schematic diagram illustrating an unlocking interface according to an embodiment of the present disclosure.

At S106, the first display layer, the second display layer and the third display layer with respective specified transparencies are superimposed to generate the unlocking interface. Exemplarily, a display effect of the unlocking interface can be illustrated in FIG. 7.

Alternatively, superimposing the first display layer, the second display layer and the third display layer with respective specified transparencies to generate the unlocking interface may include:

setting the first display layer with a first transparency as a bottom layer;

superimposing the second display layer with a second transparency on the first display layer;

superimposing the third display layer with a third transparency on the second display layer.

Figure 6:
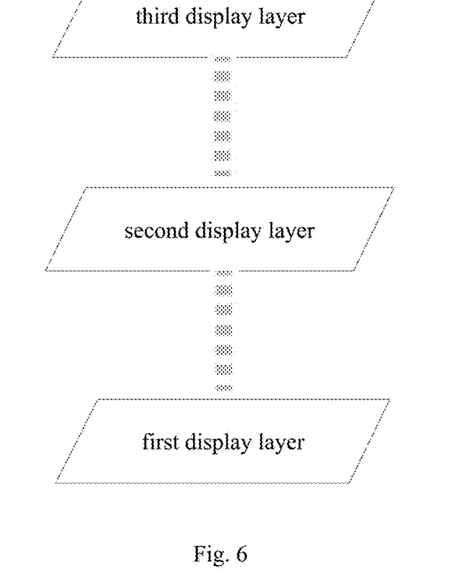
FIG. 6 is a schematic diagram illustrating a structure of layers of the unlocking interface according to an embodiment of the present disclosure.

Exemplarily, a mode of superimposing the three display layers of the unlocking interface in the present disclosure is illustrated in FIG. 6.

In some embodiments of the present disclosure, the first transparency is lower than the second transparency and the second transparency is lower than the third transparency.

The above may be applied to unlocking products of Internet applications, through settings of the three display layers of the unlocking interface, and by performing the enlarging Gaussian blur and the transparent Blending on the first icon file of the application which is selected by the user, a purpose of simulating a display effect of frosted glass may be further realized based on the realization that the user can recognize the unlocking application through the unlocking background.

It can be seen that, with the method for generating the unlocking interface provided in the embodiments of the present disclosure, after the unlocking request for the application locked by the application locker is received, the application to be unlocked and the first icon file of the application to be unlocked are determined according to the unlocking request; the first color value is extracted according to the first icon file of the application to be unlocked and the first display layer of the unlocking interface corresponding to the application to be unlocked is formed according to the first color value; the pre-generated special-effects picture corresponding to the first icon file of the application to be unlocked is acquired and the second display layer of the unlocking interface corresponding to the application to be unlocked is formed according to the special-effects picture; the third display layer of the unlocking interface corresponding to the application to be unlocked is formed according to the unlocking interactive information of the application locker; and the first display layer, the second display layer and the third display layer with respective specified transparencies are superimposed to generate the unlocking interface.

Compared with the related art, the present disclosure only superimposes the three display layers of the unlocking interface so as to generate the unlocking interface with the same display effect as the related art and consumption of the central processing unit and the graphics processing unit is low.

Figure 8:
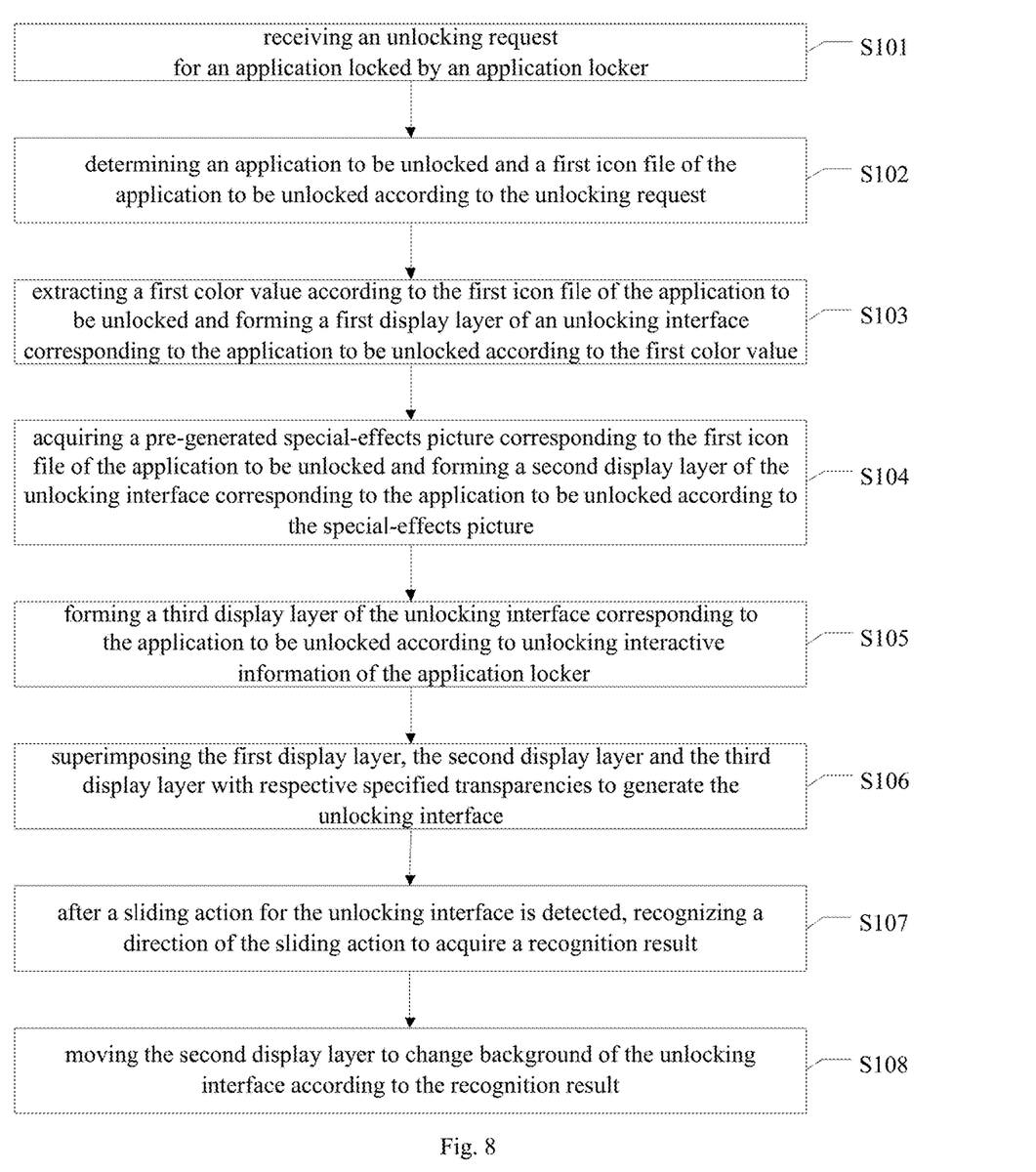
FIG. 8 is a flow chart of another method for generating an unlocking interface according to an embodiment of the present disclosure.

Alternatively, in another embodiment of the present disclosure, as illustrated in FIG. 8, a method for displaying an unlocking interface provided in an embodiment of the present disclosure may include S101, S102, S103, S104, S105, S106, S107, and S108. S101, S102, S103, S104, S105 and S106 are described in the method embodiment illustrated in FIG. 1, which will not be described again. The details of S107 and S108 are described as follows.

At S101, an unlocking request for an application locked by an application locker is received.

At S102, an application to be unlocked and a first icon file of the application to be unlocked are determined according to the unlocking request.

At S103, a first color value is extracted according to the first icon file of the application to be unlocked and a first display layer of an unlocking interface corresponding to the application to be unlocked is formed according to the first color value.

At S104, a pre-generated special-effects picture corresponding to the first icon file of the application to be unlocked is acquired and a second display layer of the unlocking interface corresponding to the application to be unlocked is formed according to the special-effects picture.

At S105, a third display layer of the unlocking interface corresponding to the application to be unlocked is formed according to unlocking interactive information of the application locker.

At S106, the first display layer, the second display layer and the third display layer with respective specified transparencies are superimposed to generate the unlocking interface.

At S107, after a sliding action for the unlocking interface is detected, a direction of the sliding action is recognized to acquire a recognition result.

For example, if the user slides the unlocking interface to the left, the terminal device can recognize that the direction of the sliding action is the left.

At S108, the second display layer is moved to change background of the unlocking interface according to the recognition result.

In at least one embodiment of the present disclosure, a physical direction of a gesture can be used to simultaneously change a position of a blur icon to increase interaction between the gesture of the user and the icon.

According to a specific embodiment provided in the present disclosure, the above-described S108 may include: moving the second display layer along a direction opposite to the direction of the sliding action to change the background of the unlocking interface.

Figure 9:
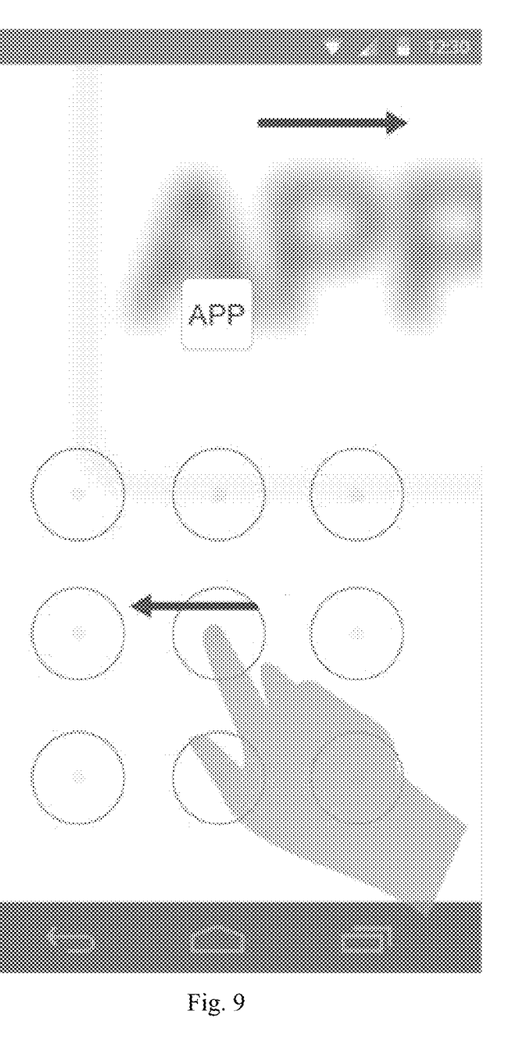
FIG. 9 is a schematic diagram illustrating a user sliding an unlocking interface according to an embodiment of the present disclosure.

As an example, as illustrated in FIG. 9, when the user slides the unlocking interface to the left, the background of the unlocking interface slides to the right.

Alternatively, a moving distance in the present disclosure may be: a result of a sliding displacement * a preset proportional value.

It is to be noted that the preset proportional value in the present disclosure is usually 0.25 depending on empirical values. Certainly, the preset proportional value may be set according to actual demands. The present embodiment is not limited thereto.

Corresponding to the method embodiments described above, the present disclosure also provides an apparatus for generating an unlocking interface.

Figure 10:
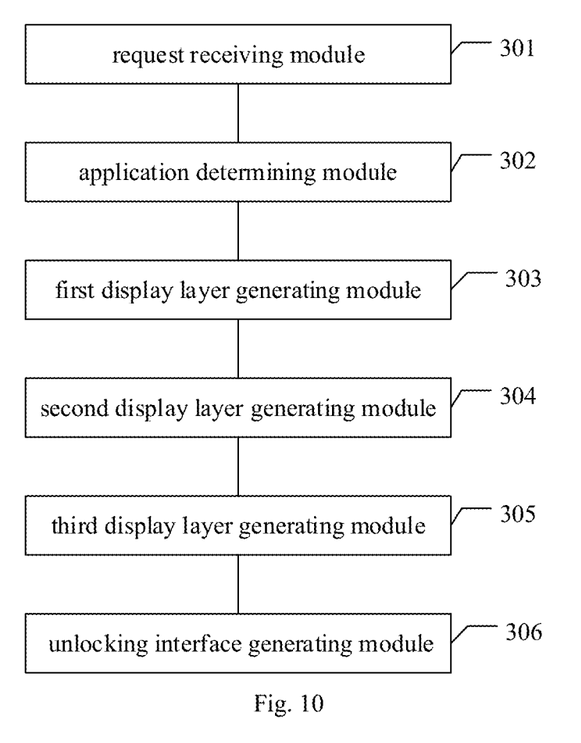
FIG. 10 is a block diagram illustrating an apparatus for generating an unlocking interface according to an embodiment of the present disclosure.

As illustrated in FIG. 10, an apparatus for generating an unlocking interface according to an embodiment of the present disclosure may include a request receiving module 301, an application determining module 302, a first display layer generating module 303, a second display layer generating module 304, a third display layer generating module 305 and an unlocking interface generating module 306.

The request receiving module 301 is configured to receive an unlocking request for an application locked by an application locker.

The application determining module 302 is configured to determine an application to be unlocked and a first icon file of the application to be unlocked according to the unlocking request received by the request receiving module 301.

The first display layer generating module 303 is configured to extract a first color value according to the first icon file of the application to be unlocked and to form a first display layer of an unlocking interface corresponding to the application to be unlocked according to the first color value.

The second display layer generating module 304 is configured to acquire a pre-generated special-effects picture corresponding to the first icon file of the application to be unlocked and to form a second display layer of the unlocking interface corresponding to the application to be unlocked according to the special-effects picture.

The third display layer generating module 305 is configured to form a third display layer of the unlocking interface corresponding to the application to be unlocked according to unlocking interactive information of the application locker.

The unlocking interface generating module 306 is configured to superimpose the first display layer generated by the first display layer generating module 303, the second display layer generated by the second display layer generating module 304 and the third display layer generated by the third display layer generating module 305 with respective specified transparencies to generate the unlocking interface.

It can be seen that, with the apparatus for generating the unlocking interface provided in the embodiments of the present disclosure, after the unlocking request for the application locked by the application locker is received, the application to be unlocked and the first icon file of the application to be unlocked are determined according to the unlocking request; the first color value is extracted according to the first icon file of the application to be unlocked and the first display layer of the unlocking interface corresponding to the application to be unlocked is formed according to the first color value; the pre-generated special-effects picture corresponding to the first icon file of the application to be unlocked is acquired and the second display layer of the unlocking interface corresponding to the application to be unlocked is formed according to the special-effects picture; the third display layer of the unlocking interface corresponding to the application to be unlocked is formed according to the unlocking interactive information of the application locker; and the first display layer, the second display layer and the third display layer with respective specified transparencies are superimposed to generate the unlocking interface.

Compared with the related art, the present disclosure only superimposes the three display layers of the unlocking interface so as to generate the unlocking interface with the same display effect as the related art and consumption of the central processing unit and the graphics processing unit is low.

Alternatively, according to an embodiment provided in the present disclosure, the unlocking interface generating module 306 is configured to:

set the first display layer with a first transparency as a bottom layer;

superimpose the second display layer with a second transparency on the first display layer;

superimpose the third display layer with a third transparency on the second display layer.

Alternatively, according to an embodiment provided in the present disclosure, the first display layer generating module 303 may include a first color value extracting sub module and a first display layer generating sub module.

The first color value extracting sub module may include a main color extracting sub unit and a first color value determining sub unit.

The main color extracting sub unit is configured to perform a color analysis on the first icon file of the application to be unlocked to determine main colors of the first icon file of the application to be unlocked.

The first color value determining sub unit is configured to select a color that matches a preset condition from the main colors determined by the main color extracting sub unit and to determine a color value of the selected color as the first color value.

The first display layer generating sub module is configured to form the first display layer of the unlocking interface corresponding to the application to be unlocked according to the first color value extracted by the first color value extracting sub module.

Alternatively, according to an embodiment provided in the present disclosure, the main color extracting sub unit is configured to:

zoom out the first icon file of the application to be unlocked to a preset first size to acquire a zoomed-out icon file; perform a Chroma scanning on the zoomed-out icon file from outside to inside to acquire the mains colors of the first icon file of the application to be unlocked.

Alternatively, according to an embodiment provided in the present disclosure, the first color value determining sub unit is configured to:

transform the main colors from a RGB chromaticity space to a HUE chromaticity space to acquire a plurality of color codes; determine a color code with the highest proportion from the plurality of color codes as the first color value.

Alternatively, according to an embodiment provided in the present disclosure, the special-effects picture corresponding to the first icon file of the application to be unlocked is one with blurred transparent effects. The apparatus further includes a special-effects picture generating module. The special-effects picture generating module may include: a first picture processing sub module, a second picture processing sub module and a third picture processing sub module.

The first picture processing sub module is configured to perform a size zooming on the first icon file of the application to be unlocked to acquire a second icon file with a preset image size.

The second picture processing sub module is configured to add transparent edges with preset length values to the second icon file acquired by the first picture processing sub module to acquire a picture with the transparent edges.

The third picture processing sub module is configured to perform a Gaussian blur and an alpha blending on the picture with the transparent edges acquired by the second picture processing sub module to generate the special-effects picture with the blurred transparent effects.

Alternatively, according to an embodiment provided in the present disclosure, the first picture processing sub module is configured to:

acquire a standard picture by using a Bitmap function, in which a size of the standard picture is equal to a preset second size;

zoom in/out the first icon file of the application to be unlocked into the standard picture to acquire the second icon file with the preset image size.

Alternatively, according to an embodiment provided in the present disclosure, the unlocking interactive information of the application locker includes an unlocking mode, an icon and a name of each of applications locked by the application locker.

The third display layer generating module 305 is configured to form the third display layer of the unlocking interface corresponding to the application to be unlocked which includes the icon and the name of the application to be unlocked according to the unlocking interactive information of the application locker.

Figure 11:
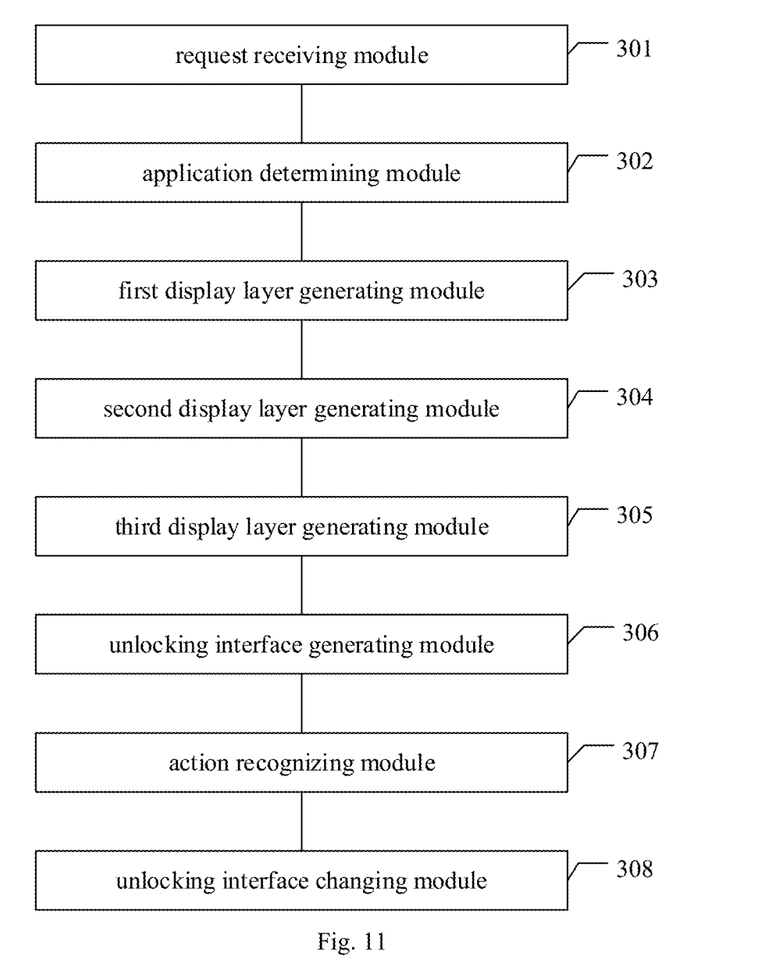
FIG. 11 is a block diagram illustrating another apparatus for generating an unlocking interface according to an embodiment of the present disclosure.

Alternatively, according to an embodiment provided in the present disclosure, as illustrated in FIG. 11, the apparatus further includes: an action recognizing module 307 and an unlocking interface changing module 308.

The action recognizing module 307 is configured to, after a sliding action for the unlocking interface is detected, recognize a direction of the sliding action to acquire a recognition result.

The unlocking interface changing module 308 is configured to move the second display layer to change background of the unlocking interface according to the recognition result of the action recognizing module 307.

Alternatively, according to an embodiment provided in the present disclosure, the unlocking interface changing module 308 is configured to:

move the second display layer along a direction opposite to the direction of the sliding action to change the background of the unlocking interface.

Corresponding to the above-mentioned method and apparatus embodiments, the description of the apparatus embodiments is relatively simple which is substantially similar to the method embodiments, and may be seen in part of the method embodiments.

The present disclosure further provides an electronic device.

The electronic device includes: a housing, a processor, a memory, a displayer, a circuit board and a power circuit. The circuit board is arranged inside a space enclosed by the housing. The processor and the memory are disposed on the circuit board. The power circuit is configured to provide power for individual circuit or component of the electronic device. The memory is configured to store an executable program code. The processor is configured to run a program corresponding to the executable program code, by reading the executable program code stored in the memory, so as to perform the followings:

receiving an unlocking request for an application locked by an application locker;

determining an application to be unlocked and a first icon file of the application to be unlocked according to the unlocking request;

extracting a first color value according to the first icon file of the application to be unlocked and forming a first display layer of an unlocking interface corresponding to the application to be unlocked according to the first color value;

acquiring a pre-generated special-effects picture corresponding to the first icon file of the application to be unlocked and forming a second display layer of the unlocking interface corresponding to the application to be unlocked according to the special-effects picture;

forming a third display layer of the unlocking interface corresponding to the application to be unlocked according to unlocking interactive information of the application locker;

superimposing the first display layer, the second display layer and the third display layer with respective specified transparencies to generate the unlocking interface.

The electronic device may have various forms, including but not limited to follows.

(1) A mobile communication device: this typed device has a capacity of mobile communication, and has a main function of providing voice, data communication. This typed terminal includes a smart phone (such as an iPhone), a multi-media phone, a functional phone and a low-level phone.

(2) A super-mobile personal computer device: this typed device pertains to a personal computer having a capacity of computing and processing and generally having a capacity of accessing mobile Internet. This typed device includes: a PDA (Personal Digital Assistant), a MID (Mobile Internet Device) and UMPC devices (Ultra-mobile Personal Computer), such as an iPad.

(3) Portable entertainment equipment: this typed device may display or play multi-medium content. This typed device includes: an audio and/or video player (such as an iPod), a handheld game player, an E-book, intelligent playthings, and portable vehicle navigation equipment.

(4) Other electronic device having a capacity of data interaction.

For the sake of convenience of description, the above description is described in terms of functions described in various modules. Certainly, the functionality of each module may be implemented in the same or more software and/or hardware when implementing this disclosure.

In order to achieve the above objectives, embodiments of the present disclosure also provide a storage medium. The storage medium is configured to store an application, and the application is configured to perform the method for generating an unlocking interface according to embodiments of the present disclosure when the application is executed. The method for generating an unlocking interface includes:

receiving an unlocking request for an application locked by an application locker;

determining an application to be unlocked and a first icon file of the application to be unlocked according to the unlocking request;

extracting a first color value according to the first icon file of the application to be unlocked and forming a first display layer of an unlocking interface corresponding to the application to be unlocked according to the first color value;

acquiring a pre-generated special-effects picture corresponding to the first icon file of the application to be unlocked and forming a second display layer of the unlocking interface corresponding to the application to be unlocked according to the special-effects picture;

forming a third display layer of the unlocking interface corresponding to the application to be unlocked according to unlocking interactive information of the application locker;

superimposing the first display layer, the second display layer and the third display layer with respective specified transparencies to generate the unlocking interface.

In order to achieve the above objectives, embodiments of the present disclosure also provide an application. The application is configured to perform the method for generating an unlocking interface according to embodiments of the present disclosure when the application is executed. The method for generating an unlocking interface includes:

receiving an unlocking request for an application locked by an application locker;

determining an application to be unlocked and a first icon file of the application to be unlocked according to the unlocking request;

extracting a first color value according to the first icon file of the application to be unlocked and forming a first display layer of an unlocking interface corresponding to the application to be unlocked according to the first color value;

acquiring a pre-generated special-effects picture corresponding to the first icon file of the application to be unlocked and forming a second display layer of the unlocking interface corresponding to the application to be unlocked according to the special-effects picture; forming a third display layer of the unlocking interface corresponding to the application to be unlocked according to unlocking interactive information of the application locker;

superimposing the first display layer, the second display layer and the third display layer with respective specified transparencies to generate the unlocking interface.

It should be noted that, in the present disclosure, relational terms such as first and second are only used to distinguish one entity or operation from another entity or operation, but do not require or imply any actual relation or order between these entities or operations. Moreover, terms such as "including", "comprising" or any other variants are intended to cover non-exclusive contains, such that the processes, methods, products or apparatus including a series of elements do not only include those items, but also include other elements which are not listed explicitly, or also include elements inherently included in the processes, methods, products or apparatuses. Without more limitations, the elements defined by a phase of "including a/an" do not exclude that other same elements also exist in the processes, methods, articles or devices including the elements.

Various embodiments in the specification are described by correlated ways, and the same or similar parts between the various embodiments may be referenced with each other. What is different from other embodiments is emphasized in each embodiment. In particular, for the apparatus embodiment, since it is substantially similar to the method embodiment, the apparatus embodiment is described simply, and for a relevant part thereof, reference may be made to part of the description of the method embodiment.

It should be understood for those skilled in the art that, all or part of steps implementing the above method embodiments can be realized by programs to instruct related hardware. The programs can be stored in a computer-readable storage medium, and the storage medium herein is ROM/RAM, disk, CD, etc.

The above description is only embodiments of the present disclosure and is not used to limit the present disclosure. Any modification, alternative or improvement made within the spirit and principle of the present disclosure falls in the protection scope of the present disclosure.

What is claimed is:

1. A method for generating an unlocking interface, comprising:
   receiving an unlocking request from a user of an electronic device for an application locked by an application locker;
   determining an application to be unlocked and a first icon file of the application to be unlocked according to the unlocking request received from the user;
   extracting a first color value of the first icon file of the application to be unlocked and forming a first display layer of an unlocking interface corresponding to the application to be unlocked according to the first color value after the application to be unlocked is determined;
   acquiring a pre-generated special-effects picture corresponding to the first icon file of the application to be unlocked and forming a second display layer of the unlocking interface corresponding to the application to be unlocked according to the pre-generated special-effects picture;
   forming a third display layer of the unlocking interface corresponding to the application to be unlocked according to unlocking interactive information of the application locker;
   superimposing the first display layer, the second display layer and the third display layer with respective specified transparencies
   to generate the unlocking interface;
   displaying the unlocking interface on the display of the electronic device after the unlocking interface is generated;
   unlocking the locked application based upon the unlocking request received from the user on the displayed unlocking interface;
   wherein the pre-generated special-effects picture is generated prior to receiving the unlocking request;
   wherein the pre-generated special-effects picture corresponding to the first icon file of the application to be unlocked is a pre-generated picture with blurred transparent effects; and
   the pre-generated special-effects picture with the blurred transparent effects is generated by performing steps comprising:
   performing a size zooming on the first icon file of the application to be unlocked to acquire a second icon file with a preset image size;
   enlarging the second icon file by adding transparent edges with preset length values surrounding the second icon file to acquire a picture with the transparent edges, such that edges of the second icon file are not cut when the picture with the transparent edges are processed by a blurring algorithm;
   performing a Gaussian blur and an alpha blending on the picture with the transparent edges to generate the special-effects picture with the blurred transparent effects.

2. The method according to claim 1, wherein extracting the first color value according to the first icon file of the application to be unlocked comprises:
   performing a color analysis on the first icon file of the application to be unlocked to determine main colors of the first icon file of the application to be unlocked;
   selecting a color that matches a preset condition from the main colors and determining a color value of the selected color as the first color value.

3. The method according to claim 2, wherein performing the color analysis on the first icon file of the application to be unlocked to determine the main colors of the first icon file of the application to be unlocked comprises:
   zooming out the first icon file of the application to be unlocked to a preset first size to acquire a zoomed-out icon file;
   performing a Chroma scanning on the zoomed-out icon file from outside to inside to acquire the mains colors of the first icon file of the application to be unlocked.

4. The method according to claim 2, wherein selecting the color that matches the preset condition from the main colors and determining the color value of the selected color as the first color value comprises:
   transforming the main colors from a RGB chromaticity space to a HUE chromaticity space to acquire a plurality of color codes;
   determining a color code with the highest proportion from the plurality of color codes as the first color value.

5. The method according to claim 1, wherein performing the size zooming on the first icon file of the application to be unlocked to acquire the second icon file with the preset image size comprises:
   acquiring a standard picture by using a Bitmap function, wherein a size of the standard picture is equal to a preset second size;
   zooming in/out the first icon file of the application to be unlocked into the standard picture to acquire the second icon file with the preset image size.

6. The method according to claim 1, wherein the unlocking interactive information of the application locker comprises an unlocking mode, an icon and a name of each of applications locked by the application locker, and
   forming the third display layer of the unlocking interface corresponding to the application to be unlocked according to the unlocking interactive information of the application locker comprises:
   forming the third display layer of the unlocking interface which corresponds to the application to be unlocked and comprises the icon and the name of the application to be unlocked according to the unlocking interactive information of the application locker.

7. The method according to claim 1, further comprising:
after a sliding action for the unlocking interface is detected, recognizing a direction of the sliding action to acquire a recognition result;
moving the second display layer to change background of the unlocking interface according to the recognition result.

8. The method according to claim 7, wherein moving the second display layer to change the background of the unlocking interface according to the recognition result comprises:
moving the second display layer along a direction opposite to the direction of the sliding action to change the background of the unlocking interface.

9. The method according to claim 1, wherein superimposing the first display layer, the second display layer and the third display layer with respective specified transparencies to generate the unlocking interface comprises:
setting the first display layer with a first transparency as a bottom layer;
superimposing the second display layer with a second transparency on the first display layer;
superimposing the third display layer with a third transparency on the second display layer.

10. An electronic device, comprising:
a housing, a processor, a memory, a displayer, a circuit board and a power circuit, wherein the circuit board is arranged inside a space enclosed by the housing;
the processor and the memory are disposed on the circuit board; the power circuit is configured to provide power for individual circuit or component of the electronic device; and
an executable program code stored in the memory; wherein the processor is configured to execute the executable program code stored in the memory that perform the following:
receiving an unlocking request from a user for an application locked by an application locker;
determining an application to be unlocked and an a first icon file of the application to be unlocked according to the unlocking request received from the user;
extracting a first color value according to the first icon file of the application to be unlocked and forming a first display layer of an unlocking interface corresponding to the application to be unlocked according to the first color value after the application to be unlocked is determined;
acquiring a pre-generated special-effects picture corresponding to the first icon file of the application to be unlocked and forming a second display layer of the unlocking interface corresponding to the application to be unlocked according to the special-effects picture;
forming a third display layer of the unlocking interface corresponding to the application to be unlocked according to unlocking interactive information of the application locker;
superimposing the first display layer, the second display layer and the third display layer with respective specified transparencies to generate the unlocking interface;
displaying the unlocking interface on the display of the electronic device after the unlocking interface is generated;
unlocking the locked application based upon the unlocking request received from the user on the displayed unlocking interface;

wherein the pre-generated special-effects picture is generated prior to receiving the unlocking request;
wherein the pre-generated special-effects picture corresponding to the first icon file of the application to be unlocked is a pre-generated picture with blurred transparent effects; and
the pre-generated special-effects picture with the blurred transparent effects is generated by performing steps comprising:
performing a size zooming on the first icon file of the application to be unlocked to acquire a second icon file with a preset image size;
enlarging the second icon file by adding transparent edges with preset length values surrounding the second icon file to acquire a picture with the transparent edges,
such that edges of the second icon file are not cut when the picture with the transparent edges are processed by a blur algorithm;
performing a Gaussian blur and an alpha blending on the picture with the transparent edges to generate the special-effects picture with the blurred transparent effects.

11. An apparatus for generating an unlocking interface, comprising:
one or more processors;
a non-transitory computer readable memory;
one or more software modules stored in the non-transitory computer readable memory and executable by the one or more processors, and comprising:
a request receiving module, configured to receive an unlocking request from a user of an electronic device for an application locked by an application locker;
an application determining module, configured to determine an application to be unlocked and a first icon file of the application to be unlocked according to the unlocking request received from the user by the request receiving module;
a first display layer generating module, configured to extract a first color value of the first icon file of the application to be unlocked and to form a first display layer of an unlocking interface corresponding to the application to be unlocked according to the first color value after the application to be unlocked is determined;
a second display layer generating module, configured to acquire a pre-generated special-effects picture corresponding to the first icon file of the application to be unlocked and to form a second display layer of the unlocking interface corresponding to the application to be unlocked according to the pre-generated special-effects picture;
a third display layer generating module, configured to form a third display layer of the unlocking interface corresponding to the application to be unlocked according to unlocking interactive information of the application locker;
an unlocking interface generating module, configured to superimpose the first display layer generated by the first display layer generating module, the second display layer generated by the second display layer generating module and the third display layer generated by the third display layer generating module with respective specified transparencies to generate the unlocking interface;

a display module, configured to display the unlocking interface on the display of the electronic device after the unlocking interface is generated;

an unlocking module, configured to unlock the locked application based upon the unlocking request received from the user on the displayed unlocking interface;

wherein the pre-generated special-effects picture is generated prior to receiving the unlocking request;

wherein the special-effects picture corresponding to the first icon file of the application to be unlocked is a pre-generated picture with blurred transparent effects;

the apparatus further comprises a special-effects picture generating module; and the special-effects picture generating module configured generate the pre-generated special-effects picture with the blurred transparent effects comprises:

a first picture processing sub module, configured to perform a size zooming on the first icon file of the application to be unlocked to acquire a second icon file with a preset image size;

a second picture processing sub module, configured to enlarge the second icon file by adding transparent edges with preset length values to the second icon file acquired by the first picture processing sub module surrounding acquire a picture with the transparent edges, such that edges of the second icon file are not cut when the picture with the transparent edges are processed by a blur algorithm;

a third picture processing sub module, configured to perform a Gaussian blur and an alpha blending on the picture with the transparent edges acquired by the second picture processing sub module to generate the special-effects picture with the blurred transparent effects.

12. The apparatus according to claim 11, wherein the first display layer generating module comprises a first color value extracting sub module and a first display layer generating sub module;

the first color value extracting sub module comprises:

a main color extracting sub unit, configured to perform a color analysis on the first icon file of the application to be unlocked to determine main colors of the first icon file of the application to be unlocked;

a first color value determining sub unit, configured to select a color that matches a preset condition from the main colors determined by the main color extracting sub unit and to determine a color value of the selected color as the first color value;

the first display layer generating sub module is configured to form the first display layer of the unlocking interface corresponding to the application to be unlocked according to the first color value extracted by the first color value extracting sub module.

13. The apparatus according to claim 12, wherein the main color extracting sub unit is configured to: zoom out the first icon file of the application to be unlocked to a preset first size to acquire a zoomed-out icon file; perform a Chroma scanning on the zoomed-out icon file from outside to inside to acquire the mains colors of the first icon file of the application to be unlocked.

14. The apparatus according to claim 12, wherein the first color value determining sub unit is configured to:

transform the main colors from a RGB chromaticity space to a HUE chromaticity space to acquire a plurality of color codes;

determine a color code with the highest proportion from the plurality of color codes as the first color value.

15. The apparatus according to claim 11, wherein the first picture processing sub module is configured to: acquire a standard picture by using a Bitmap function, wherein a size of the standard picture is equal to a preset second size; zoom in/out the first icon file of the application to be unlocked into the standard picture to acquire the second icon file with the preset image size.

16. The apparatus according to claim 11, wherein the unlocking interactive information of the application locker comprises an unlocking mode, an icon and a name of each of applications locked by the application locker, and the third display layer generating module is configured to form the third display layer of the unlocking interface which corresponds to the application to be unlocked and comprises the icon and the name of the application to be unlocked according to the unlocking interactive information of the application locker.

17. The apparatus according to claim 11, further comprising:

an action recognizing module, configured to, after a sliding action for the unlocking interface is detected, recognize a direction of the sliding action to acquire a recognition result;

an unlocking interface changing module, configured to move the second display layer to change background of the unlocking interface according to the recognition result of the action recognizing module.

18. The apparatus according to claim 17, wherein the unlocking interface changing module is configured to:

move the second display layer along a direction opposite to the direction of the sliding action to change the background of the unlocking interface.

* * * * *